Nov. 21, 1933.   N. C. LINDBERG   1,936,307
METHOD OF PRODUCING TRI-ALKALI PHOSPHATE FROM FERROPHOSPHORUS
Filed Jan. 27, 1932
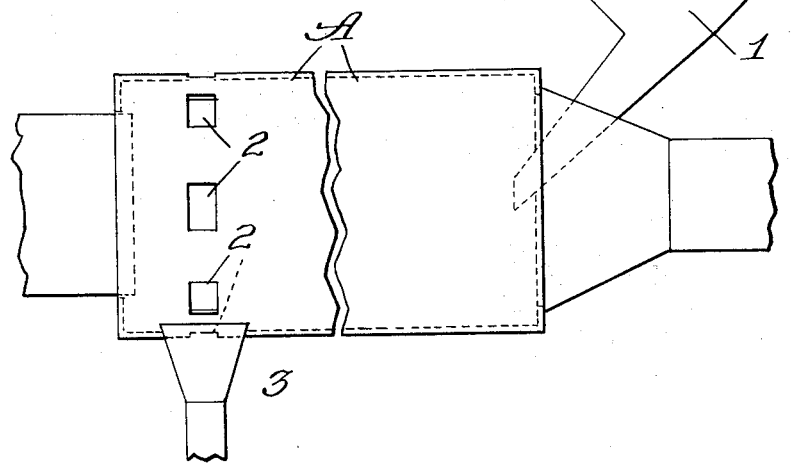
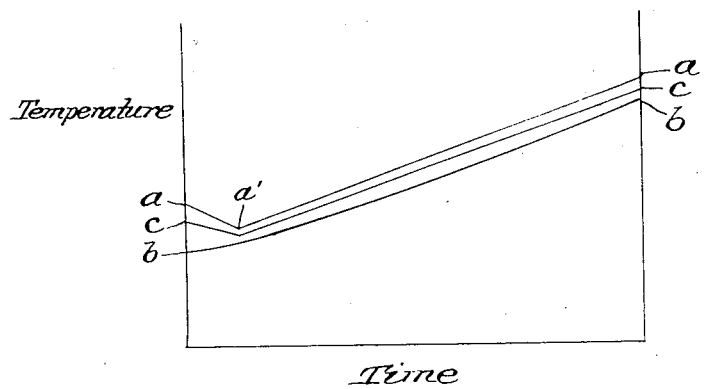
Inventor:
Nils Carlson Lindberg,
By Dyrenforth, Lee, Chritton & Wiles,
Attys.

Patented Nov. 21, 1933

1,936,307

UNITED STATES PATENT OFFICE

1,936,307

METHOD OF PRODUCING TRI-ALKALI PHOSPHATE FROM FERROPHOSPHORUS

Nils Carlson Lindberg, Crete, Ill., assignor to Victor Chemical Works, a corporation of Illinois Application January 27, 1932. Serial No. 589,278

2 Claims. (Cl. 23—106)

This invention relates to an improved method of producing tri-alkali phosphate from ferrophosphorus.

In the production of tri-alkali phosphate from ferrophosphorus by the use of an alkali or alkali carbonate such as sodium carbonate, or the like, the value of the use of an initial temperature below fusion is already recognized in the art, as is set forth in the co-pending application of Lindberg and Toubes, Ser. No. 506,303, filed January 2nd, 1931.

For example, in the production of tri-sodium phosphate from ferrophosphorus and sodium carbonate, an initial reaction temperature of 600° C. is in general ample to initiate the reaction. As the reaction goes forward, however, and the reacting ingredients become intermingled with the products of the reaction, it becomes necessary to use an increasingly higher temperature, and ultimately to employ one which is very materially above the melting point of the initial mixture.

I have discovered, however, that the melting point of the reacting mixture is higher at the close of the reaction than at the start, although there is an intermediate period when the melting point may actually decline.

In accordance with this invention, an initial temperature well below the fusion point of the mixture is employed, and the temperature of the mass is gradually raised until it reaches a point much above the fusion point of the initial mixture, but such temperature is at all times kept below the fushion point of the mixture then present. Thus, while the temperature may reach a point several hundred degrees above that at which the original mixture would melt, the temperature of any particular combination of materials is so controlled that it is never above the point at which that particular combination will melt. In carrying out such a process, due allowance has to be made for the fact that, while the melting point of the final products of the reaction is considerably above that of the initial ingredients, the melting point of certain intermediate mixtures may be below that of the initial reaction mixture.

The melting point curve is shown diagrammatically in Fig. 2 by the line a—a. On account of the drop indicated at the point a', it is therefore essential, in order to maintain a uniform temperature gradient, that the initial temperature be well below the fusion point, and yet must be at a reaction temperature. A typical temperature gradient is indicated by the line b—b in Fig. 2. It is, of course, possible in a batch operation to follow an irregular temperature gradient as indicated by the line c—c, but this is not readily accomplished in a continuous operation.

In carrying out this invention, it is preferred to proceed in a rotary kiln A, as shown diagrammatically in Fig. 1. The charge may be introduced through the hopper 1, as indicated, and gradually progresses through the kiln to the openings 2, where it falls into the chute 3 and is removed. Heating may be accomplished by any of the well known means, but a blast of heated gases, as, for example, gases from the combustion of petroleum hydrocarbons, is preferred. These gases are preferably introduced countercurrent to the flow of the material in the kiln. The gases may be introduced at any temperature above the reaction temperature of the mixture, as from 900 to 1300° C., but a temperature of around 1200° C. is in general preferred. The temperature and volume of the gas is likewise adjusted so that a substantially uniform temperature gradient is maintained in the kiln, and yet such that no part of the material therein is ever above its fusion point. For a kiln of the above type with a final temperature of the material of around 1200° C., an initial temperature of, say, 550 to 700°, and preferably of about 600° C. is preferred. These figures apply for a kiln in which the material remains on an average of about one-half hour. If the progress of the ingredients is substantially more rapid, it may be necessary to lower the gradient or the final temperature in order to prevent fusion. In normal operation, however, where the ingredients undergo reaction substantially uniformly throughout the kiln, the gradient set forth is satisfactory.

The foregoing detailed description has been given for clearness of understanding only, and no unnecessary limitations should be understood therefrom, but the appended claims should be construed as broadly as permissible, in view of the prior art.

I claim:

1. The method of reacting ferrophosphorus and an alkali carbonate which comprises, heating said materials to a reaction temperature below fusion temperature, passing said reacting materials through a heating zone countercurrent to the heated gases, while gradually increasing the temperature of said materials to a point above the fusion point of the initial mixture, but below the fusing point of the mass at each particular temperature, said initial reaction temperature being from 550 to 700° C., and the final reaction temperature being from 1100° to 1250° C.

2. The process as set forth in claim 1, in which the initial reaction temperature is 600° C. and the final temperature is 1200° C.

NILS CARLSON LINDBERG.